(12) United States Patent
Deng et al.

(10) Patent No.: US 12,474,617 B2
(45) Date of Patent: Nov. 18, 2025

(54) DISPLAY PANEL AND MANUFACTURING METHOD THEREOF

(71) Applicant: TCL China Star Optoelectronics Technology Co., Ltd., Shenzhen (CN)

(72) Inventors: Hongzhao Deng, Shenzhen (CN); Jing Liu, Shenzhen (CN); Hao Chen, Shenzhen (CN); Linnan Chen, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/785,436

(22) PCT Filed: Jun. 7, 2022

(86) PCT No.: PCT/CN2022/097370
§ 371 (c)(1),
(2) Date: Jun. 15, 2022

(87) PCT Pub. No.: WO2023/221195
PCT Pub. Date: Nov. 23, 2023

(65) Prior Publication Data
US 2024/0192567 A1    Jun. 13, 2024

(30) Foreign Application Priority Data
May 17, 2022   (CN) .......................... 202210541196.X (51) Int. Cl.
*G02F 1/1685* (2019.01)
*G02F 1/1677* (2019.01)

(52) U.S. Cl.
CPC .......... *G02F 1/1685* (2019.01); *G02F 1/1677* (2019.01)

(58) Field of Classification Search
CPC ........ G02F 1/167; G02F 1/165; G02B 26/005
(Continued)

(56) References Cited

U.S. PATENT DOCUMENTS 3,684,683 A * 8/1972 Ota .......................... G02F 1/167
399/178
3,689,400 A * 9/1972 Ota .......................... G02F 1/167
399/178
(Continued)

FOREIGN PATENT DOCUMENTS

CN    103910728 A    7/2014
CN    106405823 A    2/2017
(Continued)

OTHER PUBLICATIONS

Limin Hu, et al., Facile synthesis of BiOF/Bi2O3/reduced graphene oxide photocatalyst with highly efficient and stable natural sunlight photocatalytic performance,Journal of Alloys and Compounds, vol. 633, 2015, pp. 256-264 (Year: 2015).*
(Continued)

*Primary Examiner* — Zachary W Wilkes
(74) *Attorney, Agent, or Firm* — Nathan & Associates Patent Agents Ltd.; Menachem Nathan (57) ABSTRACT

The present invention provides a display panel and a manufacturing method of the display panel. In the present invention, an adjustment structure is arranged on the light-emitting layer, and black photosensitive particles are arranged in the adjustment structure. When the display panel is in a bright state, light emitted by the light-emitting unit illuminates the black photosensitive particles, and the black photosensitive particles move toward positions corresponding to first gaps. Therefore, brightness at the light-emitting units is increased, and brightness at the first gaps is decreased. Accordingly, a contrast ratio of the display panel is increased.

17 Claims, 4 Drawing Sheets

(58) Field of Classification Search
USPC ............................................... 359/296
See application file for complete search history.

(56) References Cited

U.S. PATENT DOCUMENTS

| | | | | |
|---|---|---|---|---|
| 3,772,013 | A * | 11/1973 | Wells | G03G 17/04 430/37 |
| 3,870,517 | A * | 3/1975 | Ota | G02F 1/1685 430/38 |
| 6,922,204 | B2 * | 7/2005 | Kanazawa | B41J 2/41 347/112 |
| 7,515,340 | B1 * | 4/2009 | Shiu | H04N 13/315 359/569 |
| 8,035,879 | B2 * | 10/2011 | Wang | G02B 26/02 345/32 |
| 2003/0214567 | A1 * | 11/2003 | Kanazawa | B41J 2/41 347/112 |
| 2010/0033798 | A1 * | 2/2010 | Wang | G02B 26/02 359/290 |
| 2017/0117505 | A1 * | 4/2017 | Kwon | H10K 59/50 |
| 2019/0250481 | A1 * | 8/2019 | Xu | G02F 1/13394 |

FOREIGN PATENT DOCUMENTS

| | | |
|---|---|---|
| CN | 107921398 A | 4/2018 |
| CN | 109188821 A | 1/2019 |
| CN | 112099284 A | 12/2020 |

OTHER PUBLICATIONS

Chiing-Chang Chen, et al., Bismuth oxyfluoride/bismuth oxyiodide nanocomposites enhance visible-light-driven photocatalytic activity, Journal of Colloid and Interface Science, vol. 532, 2018, pp. 375-386 (Year: 2018).*

International Search Report in International application No. PCT/CN2022/097370, mailed on Feb. 15, 2023.

Written Opinion of the International Search Authority in International application No. PCT/CN2022/097370, mailed on Feb. 15, 2023.

* cited by examiner

| producing a light-emitting layer on a substrate, wherein the light-emitting layer includes a plurality of light-emitting units, and a first gap is defined between each two of the light-emitting units | S10 |

↓

| producing an adjustment structure on one side of the light-emitting layer away from the substrate, wherein the adjustment structure includes a plurality of black photosensitive particles, wherein when the display panel is in a bright state, light emitted from the light-emitting units illuminate the black photosensitive particles, and the black photosensitive particles move to positions corresponding to the first gaps. When the display panel is in a dark state, the black photosensitive particles are uniformly distributed in the adjustment structure | S20 |

DISPLAY PANEL AND MANUFACTURING METHOD THEREOF

FIELD OF DISCLOSURE

The present application relates to a field of display technology and in particular, to a display panel and a manufacturing method thereof.

DESCRIPTION OF RELATED ART

New display technology is developing rapidly in this field. Users' demands for full-screen or super-large screens are gradually increasing. MLED is a general term for sub-millimeter light-emitting diode (mini LED) and micron light-emitting diode (micro LED). MLED has the advantages of fast response, wide color gamut, high PPI, and low energy consumption, and has gradually become a future display technology hot spot.

Current mini-LED and micro-LED technologies are relatively complex, especially for the mass transfer technology and the miniaturization of LED particles. The current manufacturing processes of the MLED display panels can include: backplate production, black oil production, surface mounted technology (SMT) printing, chip-on-film bonding, assembly, and other processes.

Among them, a purpose of the SMT printing is to transfer the MLEDs to the backplate. Main processes of the SMT printing include: feeding, solder paste screen printing, solder paste inspection (SPI), LED transfer, automatic optic inspection (AOI), reflow soldering, AOI, automatic rework machine, sealing, lighting aging test, etc.

There are two sealing solutions: one is to seal an entire surface with a black adhesive, which will block 50% of outgoing light, resulting in a decrease in brightness of the display panel; moreover, the black adhesive has uneven surfaces and poor ink color consistency. The other solution is to dispose a black adhesive between two adjacent LEDs, and then place a transparent epoxy layer on an entire surface. In this scheme, the black adhesive has disadvantages such as uneven surfaces, poor flatness, a complex process flow, and different contrast ratios throughout the display panel; moreover, the transparent epoxy layer also has uneven surfaces, and the degree of light diffuse reflection problems varies from place to place, which affects viewing experiences.

SUMMARY

The present invention is directed to providing a display panel and a manufacturing method thereof, which can solve problems such as low brightness, uneven sealing surfaces, low contrast ratios, a complicated process flow, and low efficiency in conventional display panels.

In order to solve the above problems, the present invention provides a display panel, which comprises:
 a substrate;
 a light-emitting layer disposed on the substrate, wherein the light-emitting layer comprises a plurality of light-emitting units, and a first gap is defined between each two of the light-emitting units; and
 an adjustment structure arranged on one side of the light-emitting layer away from the substrate, wherein the adjustment structure comprises a plurality of black photosensitive particles in the adjustment structure;
 wherein when the display panel is in a bright state, light emitted from the light-emitting units illuminate the black photosensitive particles, and the black photosensitive particles move to positions corresponding to the first gaps.

Furthermore, when the display panel is in a dark state, the black photosensitive particles are uniformly distributed in the adjustment structure.

Furthermore, the black photosensitive particles comprise a base and a modification layer surrounding the base, and a material of the modification layer comprises a chemical substance with photocatalytic properties.

Furthermore, a material of the base comprises black carbon powder or graphite.

Furthermore, a material of the modification layer comprises bismuth oxyiodide.

Furthermore, the adjustment structure further comprises:
 a first transparent substrate disposed on one side of the light-emitting layer away from the substrate;
 a second transparent substrate disposed opposite to the first transparent substrate and located on one side of the first transparent substrate away from the substrate;
 a transparent liquid disposed between the first transparent substrate and the second transparent substrate; and
 a sealant frame surrounding the transparent liquid and located between the first transparent substrate and the second transparent substrate;
 wherein the black photosensitive particles are disposed in the transparent liquid.

Furthermore, a material of the first transparent substrate comprises polyethylene terephthalate (PET).

Furthermore, a material of the second transparent substrate comprises polyethylene terephthalate (PET).

Furthermore, a material of the transparent liquid comprises PVA.

Furthermore, each of the light-emitting units comprises: at least one red LED, at least one green LED, and at least one blue LED; and photosensitive energy of each of the black photosensitive particles is less than photon energy of red light emitted by the corresponding red LED.

Furthermore, the display panel further comprises:
 a plurality of light-shielding units disposed on a surface of the substrate on one side close to the light-emitting layer and arranged corresponding to the first gaps in one-to-one correspondence.

Furthermore, a projection of each light-shielding unit projected on the substrate coincides with a projection of one of the first gaps projected on the substrate.

Furthermore, a material of the light-shielding unit comprises one or more of an epoxy-based light-shielding material and a silicone-based light-shielding material.

Furthermore, the display panel further comprises:
 a thin film transistor layer disposed between the substrate and the light-emitting layer; and
 the light-emitting layer is electrically connected to the thin film transistor layer.

Furthermore, the display panel further comprises:
 a driving chip electrically connected to the light-emitting layer.

Furthermore, a material of the substrate comprises one of a glass plate, a printed circuit board, a BT resin plate, and an aluminum plate.

Accordingly, the present application further provides a manufacturing method of a display panel, comprising the following steps:
 producing a light-emitting layer on a substrate, wherein the light-emitting layer comprises a plurality of light-emitting units, and a first gap is defined between each two of the light-emitting units; and producing an adjustment structure on one side of the light-emitting layer away from the substrate, wherein the adjustment structure comprises a plurality of black photosensitive particles, wherein when the display panel is in a bright state, light emitted from the light-emitting units illuminate the black photosensitive particles, and the black photosensitive particles move to positions corresponding to the first gaps.

Furthermore, when the display panel is in a dark state, the black photosensitive particles are uniformly distributed in the adjustment structure.

Furthermore, the step of producing the adjustment structure on one side of the light-emitting layer away from the substrate comprises:

providing a first transparent substrate; producing a sealant frame on the first transparent substrate, wherein the sealant frame and the first transparent substrate form a receiving cavity; adding a transparent liquid into the receiving cavity; adding the black photosensitive particles into the transparent liquid; placing a second transparent substrate on one side of the sealant frame away from the first transparent substrate, wherein the first transparent substrate, the sealant frame, the transparent liquid, the black photosensitive particles, and the second transparent substrate together form the adjustment structure.

Furthermore, the step of producing the adjustment structure on one side of the light-emitting layer away from the substrate further comprises:

placing the adjustment structure on one side of the light-emitting layer away from the substrate by one of compression molding, gluing, bonding, or electrostatic adhesion.

Advantages of the Present Application

The present application includes the adjustment structure in the light-emitting layer, and multiple black photosensitive particles are disposed in the adjustment structure. When the display panel is in a bright state, the light emitted from the light-emitting units illuminate the black photosensitive particles, and the black photosensitive particles move to positions corresponding to the first gaps. As a result, the black photosensitive particles at positions corresponding to the light-emitting units that emit light are moved to the first gaps that do not emit light. This way, less black photosensitive particles are at the light-emitting units, so brightness at the light-emitting units is increased; and more black photosensitive particles are at the first gaps, so brightness at the first gaps is decreased. As a result, the brightness at the light emitting units are increased, and it is darker at the first gaps, thereby increasing the display contrast of the display panel.

The present invention gets rid of a black adhesive disposed on an entire surface of a light-emitting layer in conventional techniques, and prevents problems of low brightness and poor quality in the conventional techniques. The present invention removes black oil between light-emitting units in the conventional techniques, and prevents problems such as low contrast ratios, a complicated process flow, and low efficiency in the conventional techniques.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DESCRIPTION OF REFERENCE NUMERALS 100 display panel;
1 substrate; 2 light-emitting layer
3 adjustment structure; 4 thin film transistor layer;
5 first gap; 6 light-shielding unit;
2. light-emitting unit; 211 red LED;
212 green LED; 213 blue LED;
31 first transparent substrate; 32 second transparent substrate;
33 transparent liquid; 34 sealant frame;
35 black photosensitive particles; 36 receiving cavity;
351 base; 352 modification layer.

DETAILED DESCRIPTION OF EMBODIMENTS

The present invention is described in detail below with reference to the accompanying drawings, so as to fully introduce the technical content of the present invention to those skilled in the art, to provide examples to show that the present invention can be put into practice, to make clearer the technical content disclosed in the present invention, and to make the present application be more readily understood by those skilled in the art to implement the present invention. However, the present invention can be embodied in embodiments of many different forms, the protection scope of the present invention is not limited to the embodiments mentioned herein, and a description of the following embodiments is not intended to limit the scope of the present invention.

The directional terms mentioned in the present invention, such as "up", "down", "front", "rear", "left", "right", "inside", "outside", "side", only refer to directions in the accompanying drawings. The directional terms used herein are used to explain and describe the present invention, rather than to limit the protection scope of the present invention.

In the accompanying drawings, structurally identical components are denoted by the same reference numerals. Structurally or functionally similar components are denoted by like numerals throughout. In addition, for ease of understanding and description, a size and a thickness of each component shown in the accompanying drawings are not shown in scale, and the present invention does not specifically limit the size and the thickness of each component.

First Embodiment

The present embodiment provides a display panel 100. In the present embodiment, the display panel is a mini-LED display panel. In other embodiments, the display panel 100 can also be a micro-LED display panel.

Figure 1:
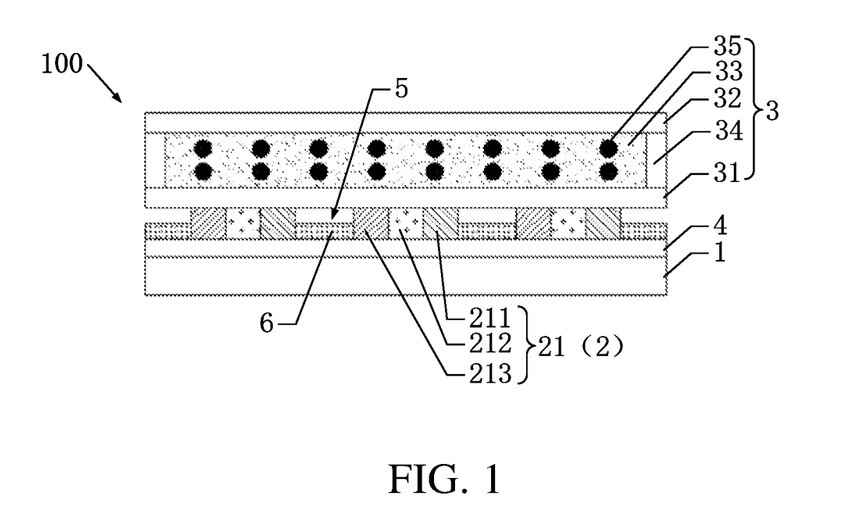
FIG. 1 is a schematic structural view of the display panel in a dark state according to a first embodiment.
Figure 2:
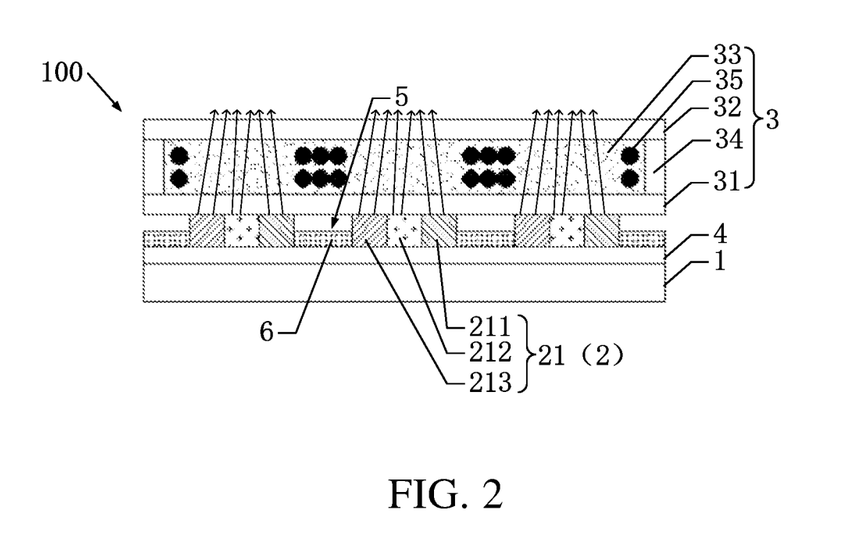
FIG. 2 is a schematic structural view of the display panel in a bright state according to the first embodiment.

As shown in FIG. 1 and FIG. 2, the display panel 100 includes: a substrate 1, a light-emitting layer 2, and an adjustment structure 3.

The substrate 1 includes one of a glass plate, a printed circuit board, a BT resin plate, or an aluminum plate. In the present embodiment, the substrate 1 is a glass plate.

In the present embodiment, the display panel 100 further includes a thin film transistor layer 4. The thin film transistor layer 4 is disposed between the substrate 1 and the light-emitting layer 2. The light-emitting layer 2 is electrically connected to the thin-film transistor layer 4, and the thin-film transistor layer 4 is mainly used for driving the light-emitting layer 2 to perform light-emitting display.

In other embodiments, a driving chip can be electrically connected to the light-emitting layer 2, and the light-emitting layer 2 can be driven by a driving chip to perform light-emitting display. The driving chip can be a micro IC or a PM driver IC.

The light-emitting layer 2 is disposed on a surface of the thin film transistor layer 4 on one side away from the substrate 1.

The light-emitting layer 2 includes a plurality of light-emitting units 21. A first gap 5 is formed between each two of the light-emitting units 21. Each of the light-emitting units 21 includes: at least one red LED 211, at least one green LED 212, and at least one blue LED 213.

The display panel 100 of the present embodiment further includes a plurality of light-shielding units 6. The light-shielding units 6 are disposed on a surface of the thin film transistor layer 4 on one side close to the light-emitting layer 2. The light-shielding units are arranged corresponding to the first gaps 5 in one-to-one correspondence. That is, each light-shielding unit 6 is disposed on a surface of the thin film transistor layer 4 in one of the first gaps 5 on one side close to the light-emitting layer 2. In the present embodiment, a projection of each light-shielding unit 6 projected on the substrate 1 coincides with a projection of one of the first gaps 5 projected on the substrate 1. The light-shielding unit 6 can be a light-shielding material such as an epoxy-based black oil or a silicone-based black oil.

The adjustment structure 3 is disposed on one side of the light-emitting layer 2 away from the substrate 1. The adjustment structure 3 includes: a first transparent substrate 31, a second transparent substrate 32, a transparent liquid 33, a sealant frame 34, and a plurality of black photosensitive particles 35.

The first transparent substrate 31 is disposed on one side of the light-emitting layer 2 away from the substrate 1. In the present embodiment, a material of the first transparent substrate 31 is PET resin. Thereby, it can be ensured that the adjustment structure 3 has a good light transmittance.

In other embodiments, the first transparent substrate 31 can also be formed by using other transparent materials.

The second transparent substrate 32 is disposed opposite to the first transparent substrate 31, and is located at one side of the first transparent substrate 31 away from the substrate 1. In the present embodiment, a material of the second transparent substrate 32 is PET resin. Thereby, it can be ensured that the adjustment structure 3 has a good light transmittance. In other embodiments, the second transparent substrate 32 can also be made of other transparent materials.

The transparent liquid 33 is disposed between the first transparent substrate 31 and the second transparent substrate 32. In the present embodiment, a material of the transparent liquid 33 is PVA resin, which can ensure that the adjustment structure 3 has a good light transmittance. In other embodiments, the transparent liquid 33 can also be made of other transparent materials.

The sealant frame 34 surrounds the transparent liquid 33 and is located between the first transparent substrate 31 and the second transparent substrate 32.

The black photosensitive particles 35 are disposed in the transparent liquid 33.

Figure 3:
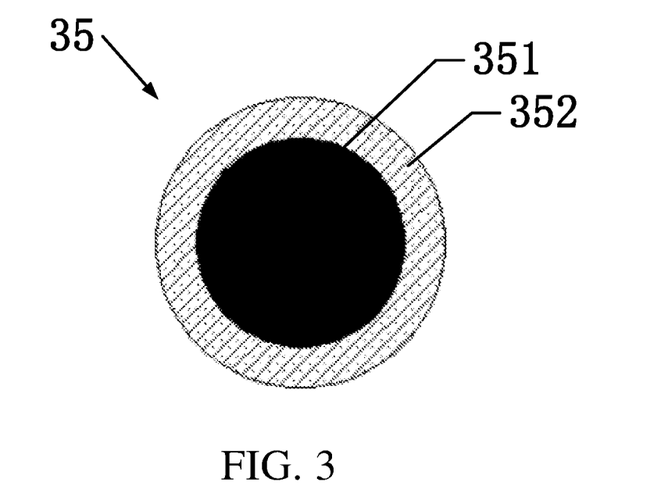
FIG. 3 is a schematic structural view illustrating a black photosensitive particle.

As shown in FIG. 3, each black photosensitive particle 35 includes a base 351 and a modification layer 352 surrounding the base 351. In the present embodiment, a material of the base 351 includes black carbon powder. A material of the modification layer 352 includes bismuth oxyiodide. In other embodiments, a material of the base 351 can also include graphite. A material of the modification layer 352 can also include other chemical substances with photocatalytic properties.

A light wavelength of the red LED 211 is generally 615-650 nm. A light wavelength of the green LED 212 is 495-530 nm. A light wavelength of the blue LED 213 is 450-480 nm.

According to a formula $E=hc/\lambda$, where E represents energy, h is Planck's constant; c is the speed of light in vacuum, and $\lambda$ is light wavelength. The light wavelength of the red LED 211 is the longest, so photon energy of the red light emitted by the red LED 211 is the lowest. The light wavelength of the blue LED 213 is the shortest, so photon energy of the blue light emitted by the blue LED 213 is the highest. Wavelengths of other color light are between the light wavelength of the red light and the light wavelength of the blue light. That is to say, photon energy of other color light is between the photon energy of the red light and the photon energy of the blue light. The photosensitive energy of each of the black photosensitive particles 35 is less than the photon energy of the red light emitted by the red LED 211, so when the red light emitted by the red LED 211 illuminates the black photosensitive particle 35, energy obtained by an irradiated side of the black photosensitive particle 35 is not equal to energy obtained by an unirradiated side, which excites the black photosensitive particle 35 to move. The photon energy of other color light is greater than the photon energy of the red light, thereby ensuring that the black photosensitive particle 35 can obtain energy from any color light and move in the dark.

As shown in FIG. 1, when the display panel 100 is in a dark state, the black photosensitive particles 35 are not irradiated, the energy obtained on a surface of each black photosensitive particle 35 is the same, and the black photosensitive particles 35 are evenly distributed in the adjustment structure 3.

As shown in FIG. 2, when the display panel 100 is in a bright state, the light emitted from the light-emitting units 21 illuminate the black photosensitive particles 35, and the black photosensitive particles 35 move to positions corresponding to the first gaps 5. As a result, the black photosensitive particles 35 at positions corresponding to the light-emitting units 21 that emit light are moved toward the first gaps 5 that do not emit light. Less black photosensitive particles 35 are at the light-emitting units 21, so brightness at the light-emitting units 21 is increased; and more black photosensitive particles 35 are at the first gaps 5, so brightness at the first gaps 5 is decreased. As a result, the brightness at the light emitting units 21 are increased, and it is darker at the first gaps 5, thereby increasing the display contrast of the display panel 100.

The display panel 100 of the present invention gets rid of a black adhesive disposed on an entire surface of a light-emitting layer in conventional techniques, and prevents problems of low brightness and poor quality in the conventional techniques.

Figure 4:
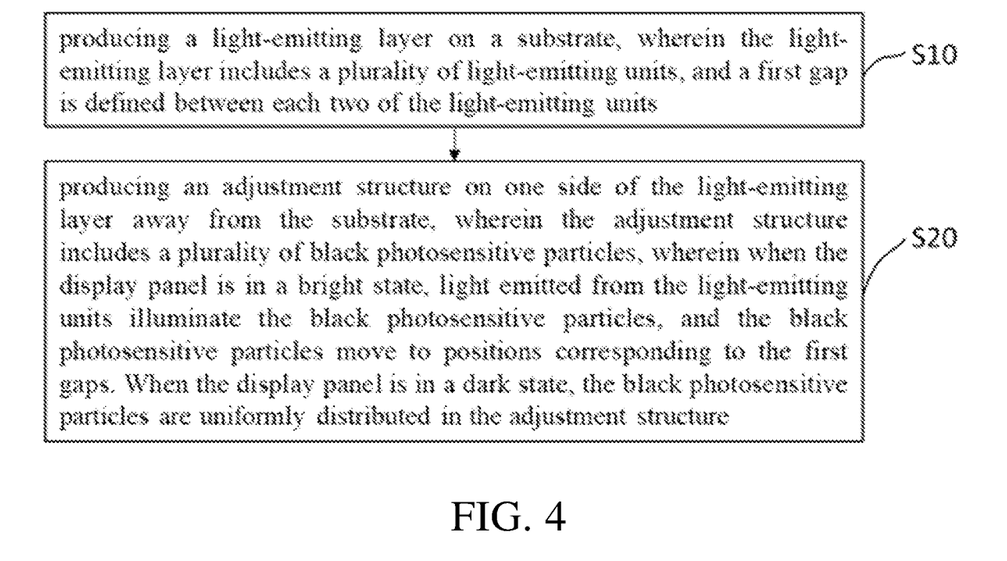
FIG. 4 is a process flow diagram illustrating manufacturing steps of the display panel according to the first embodiment.

As shown in FIG. 4, the present application also provides a manufacturing method of the display panel 100, which includes following steps.

S10: producing a light-emitting layer 2 on a substrate 1, wherein the light-emitting layer 2 includes a plurality of light-emitting units 21, and a first gap 5 is defined between each two of the light-emitting units 21; and S20: producing an adjustment structure 3 on one side of the light-emitting layer 2 away from the substrate 1, wherein the adjustment structure 3 includes a plurality of black photosensitive particles 35, wherein when the display panel 100 is in a bright state, light emitted from the light-emitting units 21 illuminate the black photosensitive particles 35, and the black photosensitive particles 35 move to positions corresponding to the first gaps 5. When the display panel 100 is in a dark state, the black photosensitive particles 35 are uniformly distributed in the adjustment structure 3.

Figure 5:
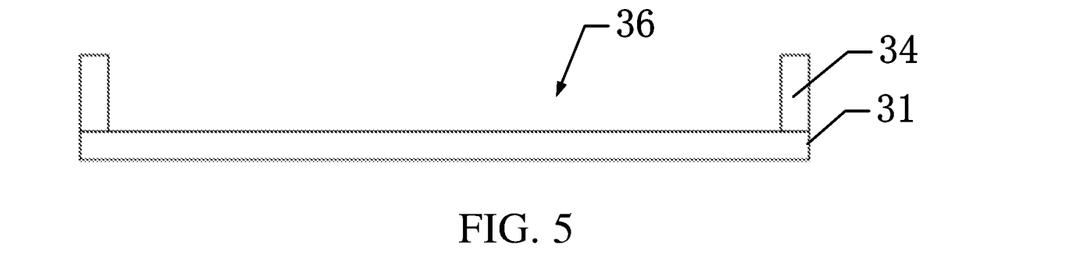
FIG. 5 is a schematic view of producing a sealant frame on a first transparent substrate.

As shown in FIG. 5, S20 includes: providing a first transparent substrate 31; producing a sealant frame 34 on the first transparent substrate 31, wherein the sealant frame 34 and the first transparent substrate 31 form a receiving cavity 36.

Figure 6:
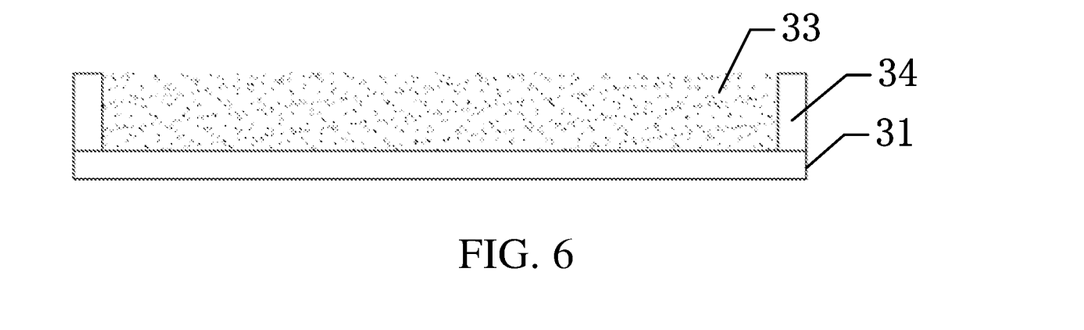
FIG. 6 is a schematic view of producing a transparent liquid in a receiving cavity formed by the first transparent substrate and the sealant frame.

As shown in FIG. 6, S20 further includes: adding a transparent liquid 33 into the receiving cavity 36.

Figure 7:
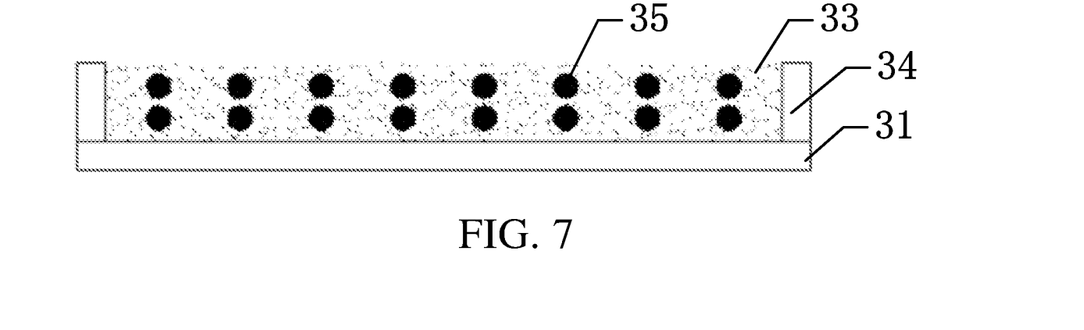
FIG. 7 is a schematic view of adding the black photosensitive particles to the transparent liquid.

As shown in FIG. 7, S20 further includes: adding the black photosensitive particles 35 into the transparent liquid 33.

Figure 8:
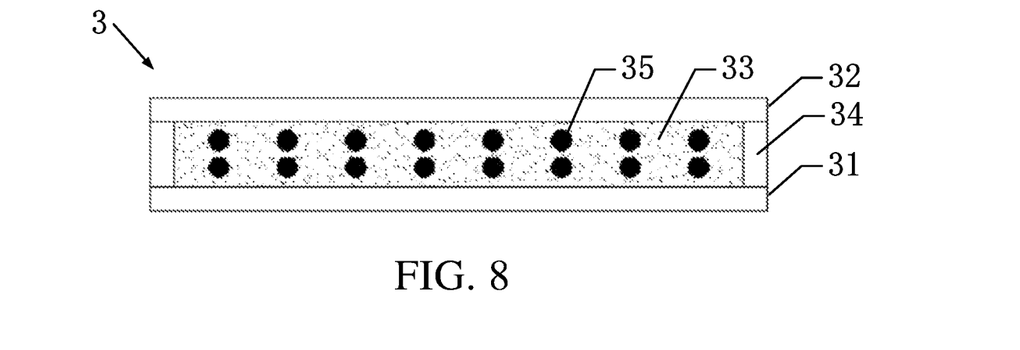
FIG. 8 is a schematic view of producing a second transparent substrate on one side of the sealant frame away from the first transparent substrate.

As shown in FIG. 8, S20 further includes: placing a second transparent substrate 32 on one side of the sealant frame 34 away from the first transparent substrate 31, wherein the first transparent substrate 31, the sealant frame 34, the transparent liquid 33, the black photosensitive particles 35, and the second transparent substrate 32 together form the adjustment structure 3.

S20 further includes: placing the adjustment structure 3 on one side of the light-emitting layer 2 away from the substrate 1 by one of compression molding, gluing, bonding, or electrostatic adhesion.

Second Embodiment

The present embodiment provides a display panel 100. In the present embodiment, the display panel is a mini-LED display panel. In other embodiments, the display panel 100 can also be a micro-LED display panel.

Figure 9:
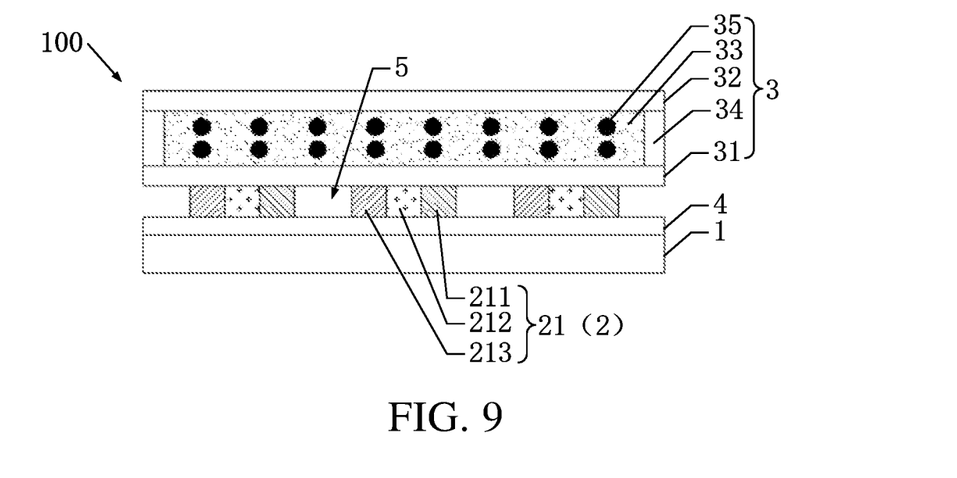
FIG. 9 is a schematic structural view of the display panel in the dark state according to a second embodiment.
Figure 10:
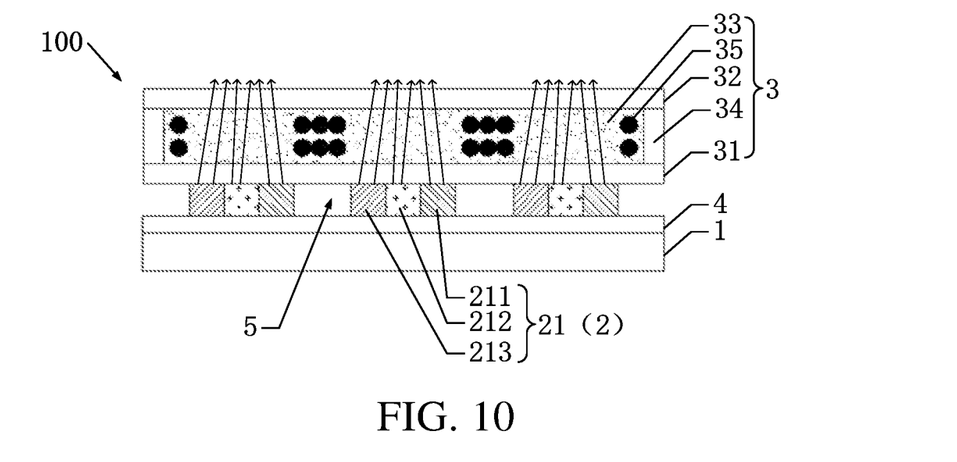
FIG. 10 is a schematic structural view of the display panel in the bright state according to the second embodiment.

As shown in FIG. 9 and FIG. 10, the display panel 100 includes: a substrate 1, a light-emitting layer 2, and an adjustment structure 3.

The substrate 1 includes one of a glass plate, a printed circuit board, a BT resin plate, and an aluminum plate. In the present embodiment, the substrate 1 is a glass plate.

In the present embodiment, the display panel 100 further includes a thin film transistor layer 4. The thin film transistor layer 4 is disposed between the substrate 1 and the light-emitting layer 2. The light-emitting layer 2 is electrically connected to the thin film transistor layer 4, and the thin film transistor layer 4 is mainly used for driving the light-emitting layer 2 to perform light-emitting display.

In other embodiments, a driving chip can be electrically connected to the light-emitting layer 2, and the light-emitting layer 2 can be driven by the driving chip to perform light-emitting display. The driving chip can be a micro IC or a PM driver IC.

The light-emitting layer 2 is disposed on a surface of the thin film transistor layer 4 on one side away from the substrate 1.

The light-emitting layer 2 includes a plurality of light-emitting units 21. A first gap 5 is formed between each two of the light-emitting units 21. Each of the light-emitting units 21 includes: at least one red LED 211, at least one green LED 212, and at least one blue LED 213.

The adjustment structure 3 is disposed on one side of the light-emitting layer 2 away from the substrate 1. The adjustment structure 3 includes: a first transparent substrate 31, a second transparent substrate 32, a transparent liquid 33, a sealant frame 34, and a plurality of black photosensitive particles 35.

The first transparent substrate 31 is disposed on one side of the light-emitting layer 2 away from the substrate 1. In the present embodiment, a material of the first transparent substrate 31 is PET resin. Thereby, it can be ensured that the adjustment structure 3 has a good light transmittance. In other embodiments, the first transparent substrate 31 can also be formed by using other transparent materials.

The second transparent substrate 32 is disposed opposite to the first transparent substrate 31, and is located at one side of the first transparent substrate 31 away from the substrate 1. In the present embodiment, a material of the second transparent substrate 32 is PET resin. Thereby, it can be ensured that the adjustment structure 3 has a good light transmittance. In other embodiments, the second transparent substrate 32 can also be made of other transparent materials.

The transparent liquid 33 is disposed between the first transparent substrate 31 and the second transparent substrate 32. In the present embodiment, a material of the transparent liquid 33 is PVA resin, which can ensure that the adjustment structure 3 has a good light transmittance. In other embodiments, the transparent liquid 33 can also be made of other transparent materials.

The sealant frame 34 surrounds the transparent liquid 33 and is located between the first transparent substrate 31 and the second transparent substrate 32.

The black photosensitive particles 35 are disposed in the transparent liquid 33.

As shown in FIG. 3, the black photosensitive particles 35 include a base 351 and a modification layer 352 surrounding the base 351. In the present embodiment, a material of the base 351 includes black carbon powder. A material of the modification layer 352 includes bismuth oxyiodide. In other embodiments, a material of the base 351 can also include graphite. A material of the modification layer 352 can also include other chemical substances with photocatalytic properties.

A light wavelength of the red LED 211 is generally 615-650 nm. A light wavelength of the green LED 212 is 495-530 nm. A light wavelength of the blue LED 213 is 450-480 nm.

According to a formula $E=hc/\lambda$, where E represents energy, h is Planck's constant; c is the speed of light in vacuum, and $\lambda$ is light wavelength. The light wavelength of the red LED 211 is the longest, so photon energy of the red light emitted by the red LED 211 is the lowest. The light wavelength of the blue LED 213 is the shortest, so photon energy of the blue light emitted by the blue LED 213 is the highest. Wavelengths of other color light are between the light wavelength of the red light and the light wavelength of the blue light. That is to say, photon energy of other color light is between the photon energy of the red light and the photon energy of the blue light. The photosensitive energy of each of the black photosensitive particles 35 is less than the photon energy of the red light emitted by the red LED 211, so when the red light emitted by the red LED 211 illuminates the black photosensitive particle 35, energy obtained by an irradiated side of the black photosensitive particle 35 is not equal to energy obtained by an unirradiated side, which excites the black photosensitive particle 35 to move. The photon energy of other color light is greater than the photon energy of the red light, thereby ensuring that the black photosensitive particle 35 can obtain energy from any color light and move in the dark.

As shown in FIG. 9, when the display panel 100 is in a dark state, the black photosensitive particles 35 are not irradiated, the energy obtained on a surface of each black photosensitive particle 35 is the same, and the black photosensitive particles 35 are evenly distributed in the adjustment structure 3.

As shown in FIG. 10, when the display panel 100 is in a bright state, the light emitted from the light-emitting units 21 illuminate the black photosensitive particles 35, and the black photosensitive particles 35 move to positions corresponding to the first gaps 5. As a result, the black photosensitive particles 35 at positions corresponding to the light-emitting units 21 that emit light are moved to the first gaps 5 that do not emit light. Less black photosensitive particles 35 are at the light-emitting units 21, so brightness at the light-emitting units 21 is increased; and more black photosensitive particles 35 are at the first gaps 5, so brightness at the first gaps 5 is decreased. As a result, the brightness at the light emitting units 21 are increased, and it is darker at the first gaps 5, thereby increasing the display contrast of the display panel 100.

The display panel 100 of the present invention gets rid of a black adhesive disposed on an entire surface of a light-emitting layer in conventional techniques, and prevents problems of low brightness and poor quality in the conventional techniques. The present invention removes black oil between light-emitting units in the conventional techniques, and avoids problems such as low contrast, a complicated process flow, and low efficiency in the conventional techniques.

The display panel and the manufacturing method thereof provided by the present application are described in detail above. Working principles and embodiments of the present application are described with specific examples. The embodiments are for ease of understanding the method and main ideas of the present application. According to the idea of the present application, those skilled in the art can change the specific embodiments and application range. In summary, the present disclosure should not be understood as a limitation to the present application.

What is claimed is:

1. A display panel, comprising:
    a substrate;
    a light-emitting layer disposed on the substrate, wherein the light-emitting layer comprises a plurality of light-emitting units, and a first gap is defined between each two of the light-emitting units; and
    an adjustment structure arranged on one side of the light-emitting layer away from the substrate, wherein the adjustment structure comprises a plurality of black photosensitive particles in the adjustment structure;
    wherein when the display panel is in a bright state, light emitted from the light-emitting units illuminate the black photosensitive particles, and the black photosensitive particles move to positions corresponding to the first gaps;
    wherein the black photosensitive particles comprise a base and a modification layer surrounding the base, a material of the modification layer comprises a chemical substance with photocatalytic properties, a material of the base comprises black carbon powder or graphite, and a material of the modification layer comprises bismuth oxyiodide.

2. The display panel according to claim 1, when the display panel is in a dark state, the black photosensitive particles are uniformly distributed in the adjustment structure.

3. The display panel according to claim 1, wherein the adjustment structure further comprises:
    a first transparent substrate disposed on one side of the light-emitting layer away from the substrate;
    a second transparent substrate disposed opposite to the first transparent substrate and located on one side of the first transparent substrate away from the substrate;
    a transparent liquid disposed between the first transparent substrate and the second transparent substrate; and
    a sealant frame surrounding the transparent liquid and located between the first transparent substrate and the second transparent substrate;
    wherein the black photosensitive particles are disposed in the transparent liquid.

4. The display panel according to claim 3, wherein a material of the first transparent substrate comprises polyethylene terephthalate (PET).

5. The display panel according to claim 3, wherein a material of the second transparent substrate comprises polyethylene terephthalate (PET).

6. The display panel according to claim 3, wherein a material of the transparent liquid comprises polyvinyl alcohol.

7. The display panel according to claim 1, wherein each of the light-emitting units comprises: at least one red LED, at least one green LED, and at least one blue LED; and the black photosensitive particles are configured to move in response to illumination by light from the red LED, the green LED, or the blue LED.

8. The display panel according to claim 1, further comprising:
    a plurality of light-shielding units disposed on a surface of the substrate on one side close to the light-emitting layer and arranged corresponding to the first gaps in one-to-one correspondence.

9. The display panel according to claim 8, wherein a projection of each light-shielding unit projected on the substrate coincides with a projection of one of the first gaps projected on the substrate.

10. The display panel according to claim 8, wherein a material of the light-shielding unit comprises one or more of an epoxy-based light-shielding material and a silicone-based light-shielding material.

11. The display panel according to claim 1, further comprising:
    a thin film transistor layer disposed between the substrate and the light-emitting layer; and the light-emitting layer is electrically connected to the thin film transistor layer.

12. The display panel according to claim 1, further comprising:
a driving chip electrically connected to the light-emitting layer.

13. The display panel according to claim 1, wherein a material of the substrate comprises one of a glass plate, a printed circuit board, a bismaleimide triazine resin plate, and an aluminum plate.

14. A manufacturing method of a display panel, comprising the following steps:
producing a light-emitting layer on a substrate, wherein the light-emitting layer comprises a plurality of light-emitting units, and a first gap is defined between each two of the light-emitting units; and
producing an adjustment structure on one side of the light-emitting layer away from the substrate, wherein the adjustment structure comprises a plurality of black photosensitive particles, wherein when the display panel is in a bright state, light emitted from the light-emitting units illuminate the black photosensitive particles, and the black photosensitive particles move to positions corresponding to the first gaps;
wherein the black photosensitive particles comprise a base and a modification layer surrounding the base, a material of the modification layer comprises a chemical substance with photocatalytic properties, a material of the base comprises black carbon powder or graphite, and a material of the modification layer comprises bismuth oxyiodide.

15. The manufacturing method of the display panel according to claim 14, when the display panel is in a dark state, the black photosensitive particles are uniformly distributed in the adjustment structure.

16. The manufacturing method of the display panel according to claim 14, wherein the step of producing the adjustment structure on one side of the light-emitting layer away from the substrate comprises:
providing a first transparent substrate; producing a sealant frame on the first transparent substrate, wherein the sealant frame and the first transparent substrate form a receiving cavity; adding a transparent liquid into the receiving cavity; adding the black photosensitive particles into the transparent liquid; placing a second transparent substrate on one side of the sealant frame away from the first transparent substrate, wherein the first transparent substrate, the sealant frame, the transparent liquid, the black photosensitive particles, and the second transparent substrate together form the adjustment structure.

17. The manufacturing method of the display panel according to claim 14, wherein the step of producing the adjustment structure on one side of the light-emitting layer away from the substrate further comprises:
placing the adjustment structure on one side of the light-emitting layer away from the substrate by one of compression molding, gluing, bonding, or electrostatic adhesion.

* * * * *